March 12, 1940.      M. F. PETERS ET AL      2,192,932
METHOD AND APPARATUS FOR TESTING SPARK PLUGS
Filed April 12, 1939      2 Sheets-Sheet 2

MELVILLE F. PETERS
H. KENDALL KING
INVENTORS

BY
*Ramon H. Davis*
ATTORNEY

Patented Mar. 12, 1940

2,192,932

UNITED STATES PATENT OFFICE 2,192,932

METHOD AND APPARATUS FOR TESTING SPARK PLUGS

Melville F. Peters and Henry Kendall King, Washington, D. C.

Application April 12, 1939, Serial No. 267,414

11 Claims. (Cl. 175—183)

(Granted under the act of March 3, 1883, as amended April 30, 1928; 370 O. G. 757)

This invention relates to a method and apparatus for revealing in the insulation of spark plugs defects which are not detectable by means now in use for the testing purposes.

In order that a spark plug shall function properly, it is necessary that a spark shall jump across a gap between electrodes which have previously reached a considerable difference of electrical potential, called the breakdown potential. Any electrical path between the electrodes which will serve to carry a current sufficient to prevent the building up of voltage to this breakdown value will prevent the spark from occurring and thereby prevent the firing of the charge in the engine cylinder into which the spark plug is screwed.

In a spark plug of good design and construction, the insulating material for ordinary voltages is almost a perfect non-conductor and even at the high voltage of spark plug operation the current through the insulation is negligibly small and the spark plug behaves as a true capacitance. However, when, after a period of use in an engine, the spark plug insulation is found to be coated with or impregnated with deposits of compounds formed from the fuel and lubricants in the combustion chamber of an engine under operating conditions, the insulating material becomes partially conducting and behaves in the ignition circuit as a capacitance shunted by a resistance.

Although a puncture of the insulating material will prevent the proper functioning of the plug, this is easily determined by noting the failure of the plug to spark when taken out of the engine and placed so that the electrode may be seen. It is more difficult, however, to find a plug which, although it will spark in the outer atmosphere, will fail to spark at the increased pressures and temperatures of the engine. The usual method of determining this is to put the spark plug in a suitable pressure bomb arranged to permit observation of the spark through a window, as the pressure of air or other gas within the bomb is increased. Such a method has serious drawbacks due to the fact that the effect of the gap of the plug and insulation of the plug cannot be separated, and it is well known that even when the gap is closely adjusted to some predetermined value, its breakdown voltage characteristics are variable when the electrodes are cold. The value of resistance due to deposited material is influenced by the temperature of the material in the deposit and also the temperature of the insulating material. Some of the deposits which normally accumulate in spark plugs have a negative temperature coefficient of resistance which makes it possible that the plug will attain a state where it will not function properly at engine operating temperatures but will function satisfactorily when tested at room temperature.

Spark plugs having laminated mica insulators are particularly susceptible to such defects since they are subject to expansion of the center shank and loosening of the center core assembly under the high temperatures and pressures of service operation. This expansion may cause a slight separation of the mica washers, and a consequent penetration of hot gases and depositing of combustion products between the layers of mica, often accompanied by permanent elongation of the shank.

It is an object of this invention to provide a method and means by which such conditions of lowered resistance by the plug core may be determined, and in which the spark plug may be simultaneously heated and subjected to a high voltage.

Other objects of the invention will become apparent from a consideration of the following description and the accompanying drawings, in which.

Figure 1:
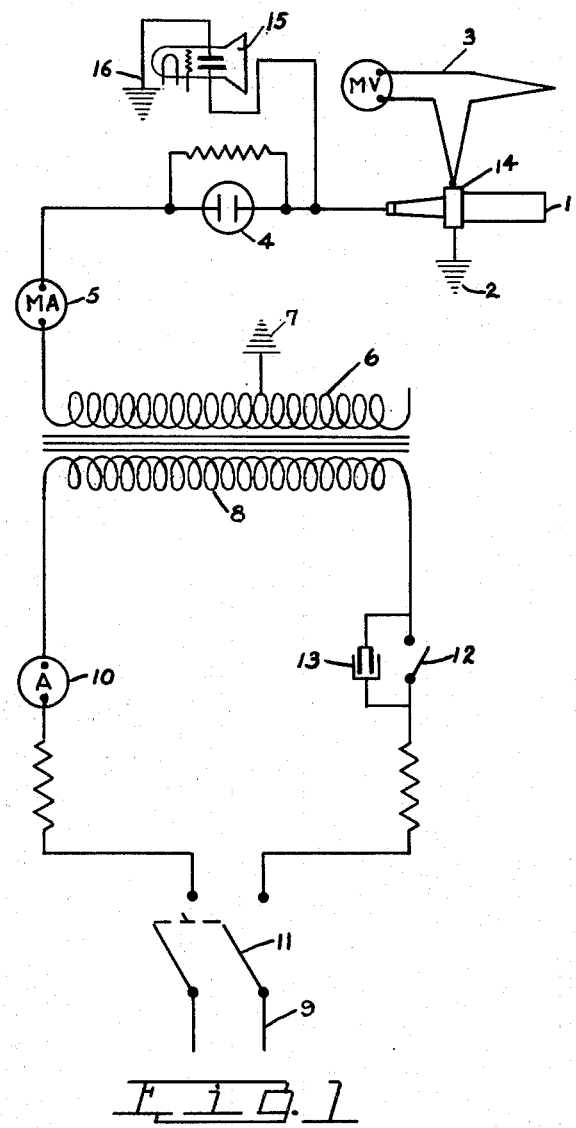
Fig. 1 is a schematic showing of one form of the electrical circuit and apparatus used in accordance with the invention.

The reference numeral 1 indicates the spark plug core to be tested. The bushing 14 is grounded at 2 and a thermocouple 3 has its hot contact touching the bushing. The central electrode of the plug is connected in a series circuit containing a neon bulb 4, a milliammeter 5, and the secondary 6 of a transformer. The secondary is grounded at 7. The primary 8 of the transformer is connected across the terminals of a 110 volt supply line 9. Included in the primary circuit is an ammeter 10, a main switch 11 and a timing switch 12 having a condenser 13 shunted around it for the purpose of suppressing arcing.

In order to preclude the possibility that deposits of conducting material may have been burned out of crevices in the core due to high operating temperatures encountered prior to testing, the core may be dipped into a weak solution of acetic acid or other suitable electrolyte before testing. The acid will enter the fissures normally occupied by deposits and act in the same manner. The plug is wiped dry before being tested so that only electrolyte caught by fissures and holes will remain.

When the plug is tested, any impairment to the conductivity of the insulator will allow the passage of leakage current which will cause the bulb 4 to light up and will give a reading on the milliammeter 5. The passage of leakage current will cause heating of the core assembly which in turn may cause more leakage current to be passed. This action is cumulative and may cause the lower end of the core assembly to approximate operating temperatures. The amount of heating will be indicated by the thermocouple. For best results all plugs should be tested over a known time interval as this allows the preparation of standards of performance against which the performance of the plug being tested may be readily checked and the degree of failure of a particular plug made more certain.

By means of an oscilloscope or oscillograph a visible trace may be had of the voltage or current variation in the test circuits and characteristic patterns are found for different types of failures, thus enabling the testing apparatus to detect and distinguish between failures due to deposited conductive materials, flashover in the upper barrel of shielded plugs or puncture or rupture of any part of the insulator.

Figure 3:
Figure 4:
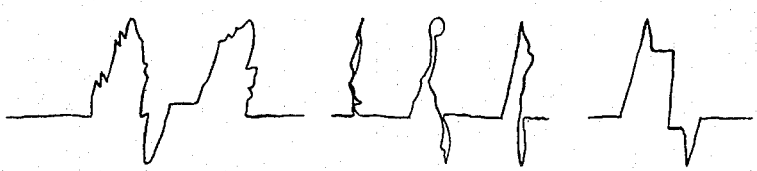
Figure 5:

In Fig. 1 an oscillograph is indicated at 15, one side being grounded at 16. Typical patterns obtained are shown in Figs. 3, 4 and 5. Fig. 3 shows the pattern obtained from a test of a normal plug, the trace of light taking the form of a sine wave. In Fig. 4 is shown patterns obtained from tests of plugs which had mica punctures. While different, these patterns all exhibit a ragged irregularity and reduction in amplitude which is characteristic of this type of defect. In Fig. 5 is shown the regular wavy pattern of small amplitude indicative of failure due to fouling by deposits of lead, carbon, etc.

Figure 2:
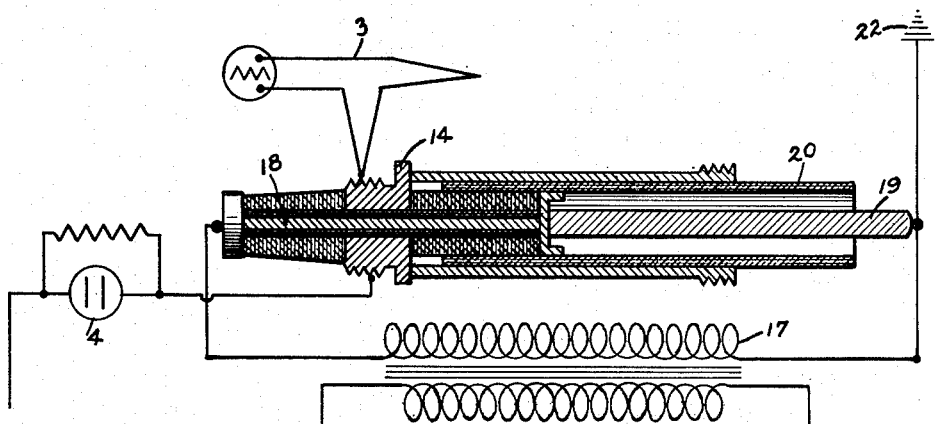
Fig. 2 is a schematic showing of a portion of the circuit of Fig. 1, with modifications; and, Figs. 3, 4 and 5 are reproductions of typical oscillograph patterns obtained in testing spark plugs in various conditions.

In Fig. 2 is shown a modification of the apparatus shown in Fig. 1. A separate source of heat is employed which is independent of the circuit of Fig. 1. The source of heat is a step down transformer, the secondary 17 of which acts as a source of low voltage heavy current. The central electrode 18 is connected at its outer end to one side of the secondary while the inner end is connected to the other side by means of a metal rod thrust into the sleeve end of the core assembly until it abuts the inner end of the electrode. A mica sleeve 20 must be thrust into the sleeve end of the assembly as shown in order to protect the metal rod from flashover. The remainder of the circuit is the same as shown in Fig. 1, with the exception that the lead from the neon tube is connected to the bushing rather than electrode 18 and the electrode is grounded at 22, Many types of defects in the mica type of insulators produce visible evidence of their presence when the insulator is tested by the means disclosed herein. Thus surface coatings of conducting materials as well as cracks present in the outside of the insulator, when filled with dirt or acetic acid cause arcing across the outside of the insulator. Similar defects when present to a lesser extent cause a corona discharge. The presence of defects such as embedded dirt or combustion products inside the insulator is indicated by regions of incandescence visible through the mica. A defective insulator heats up under the test with an accompanying production of fumes and smoke.

Other means for subjecting the plug to operating temperatures may be employed. For example, the core assembly may be heated in an oven while testing is in progress.

If it is desirable or necessary to test the plug without disassembly or removal of the shell, this may be done by using the present method, with the plug screwed into a pressure bomb in which the pressure is raised sufficiently high to inhibit the sparking at the gap.

In failures involving deposits of carbon, lead compounds, etc., on the surface or impregnated in the insulation, the current leakage path is often discontinuous for low voltages so that low voltage testers such as a 500 volt or 1000 volt megger will show infinite resistance for such a path. This makes it necessary to use a high voltage to break down the small gaps in the leakage path.

While the description and drawings have been confined to a single embodiment of the testing apparatus, it is to be understood that this apparatus may take various forms and the scope of the invention is only to be restricted by the scope of the subjoined claims.

The invention herein described and claimed may be used and/or manufactured by or for the Government of the United States of America for governmental purposes without the payment of any royalties thereon or therefor.

We claim:

1. A method of testing spark plug insulators which comprises the steps of immersing the core assembly of a spark plug in an electrolyte, wiping the electrolyte from the surface of said insulator, impressing across the exterior of said insulator and the central electrode of said assembly a voltage of such magnitude as to cause a measurable current leakage if the insulating qualities of said insulator have been impaired and indicating the amount of current leakage and the heating of the core assembly caused thereby.

2. The method of testing spark plug insulators for conductive defects which comprises creating between the inner and outer surfaces of said insulator a difference of electrical potential of sufficient magnitude to cause a current flow through said insulator if said insulator contains a conductive defect of sufficient magnitude to render it undesirable for service, and maintaining said current flow for a length of time necessary to produce heat in said insulator comparable to that produced under service conditions.

3. The method of claim 2 which includes the step of measuring the amount of current flow through said insulator, whereby by comparison with standard performances the condition of the insulator may be determined.

4. The method of testing spark plug insulators for conductive defects which comprises heating the core assembly of said plug to a temperature approximating that encountered under operating conditions, creating between the inner and outer surfaces of said insulator a difference of electrical potential of sufficient magnitude to cause a current to flow through said insulator if said insulator contains a conductive defect of sufficient magnitude to render it undesirable for service and indicating the amount of said current flow.

5. The method of testing spark plug insulators for conductive defects which comprises heating the core assembly of said plug to a temperature approximating that encountered under operating conditions creating between the inner and outer surfaces of said insulator a difference of electrical potential of sufficient magnitude to cause a current to flow through said insulator if said insulator contains a conductive defect of sufficient magnitude to render it undesirable for service and visually reproducing the voltage characteristics of the electrical circuit which includes said insulator, whereby the type of flaw existing in said insulator will be apparent by the pattern of voltage characteristics so produced.

6. The method of testing spark plug insulators which comprises, removing the electrodes of a spark plug from sparking relationship, impressing across the exterior of the insulator of said spark plug and the central electrode thereof a voltage of such magnitude as to cause a measurable current leakage if the insulating qualities of said insulator have been impaired and measuring said current leakage.

7. The method of testing spark plug insulators which comprises, removing the electrodes of a spark plug from sparking relationship, impressing across the exterior of the insulator of said spark plug and the central electrode thereof a voltage of such magnitude as to cause a measurable current leakage if the insulating qualities of said insulator have been impaired and visually reproducing the voltage characteristics of the electrical circuit which includes said insulator, whereby the nature of any flaw existing in said insulator will be made apparent by the pattern of said characteristics.

8. The method of testing spark plug insulators which comprises, removing the electrodes of a spark plug from sparking relationship, impressing across the exterior of the insulator of said spark plug and the central electrode thereof a voltage of such magnitude as to cause a measurable current leakage if the insulating qualities of said insulator have been impaired, while subjecting said insulator to a temperature comparable to that encountered in service conditions.

9. Means for testing spark plug insulators which comprises, a source of high voltage, an electrical circuit containing said source and a spark plug the insulator of which is to be tested, said circuit having a connection to each side of the insulator of said spark plug, means preventing a completion of said circuit through said spark plug along any path unless said insulator is defective, and means for measuring any flow of current through said circuit.

10. Means for testing spark plug insulators which comprises, a source of high voltage, an electrical circuit containing said source and a spark plug the insulation of which is to be tested, said circuit having a connection to each side of the insulator of said spark plug, means preventing a completion of said circuit through said spark plug along any path unless said insulator is defective, means for measuring any flow of current through said circuit and means for subjecting said spark plug to temperatures comparable to those encountered under service conditions.

11. Means for testing spark plug insulators which comprises, a source of high voltage, an electrical circuit containing said source and a spark plug the insulation of which is to be tested, said circuit having a connection to each side of the insulator of said spark plug, means preventing a completion of said circuit through said spark plug along any path unless said insulator is defective, means for measuring any flow of current through said circuit and means visually reproducing the voltage characteristics of current flowing through said circuit whereby the nature of any flaw existing in said insulator will be made apparent by the pattern of said characteristics.

MELVILLE F. PETERS.
H. KENDALL KING.